Patented Mar. 27, 1923.

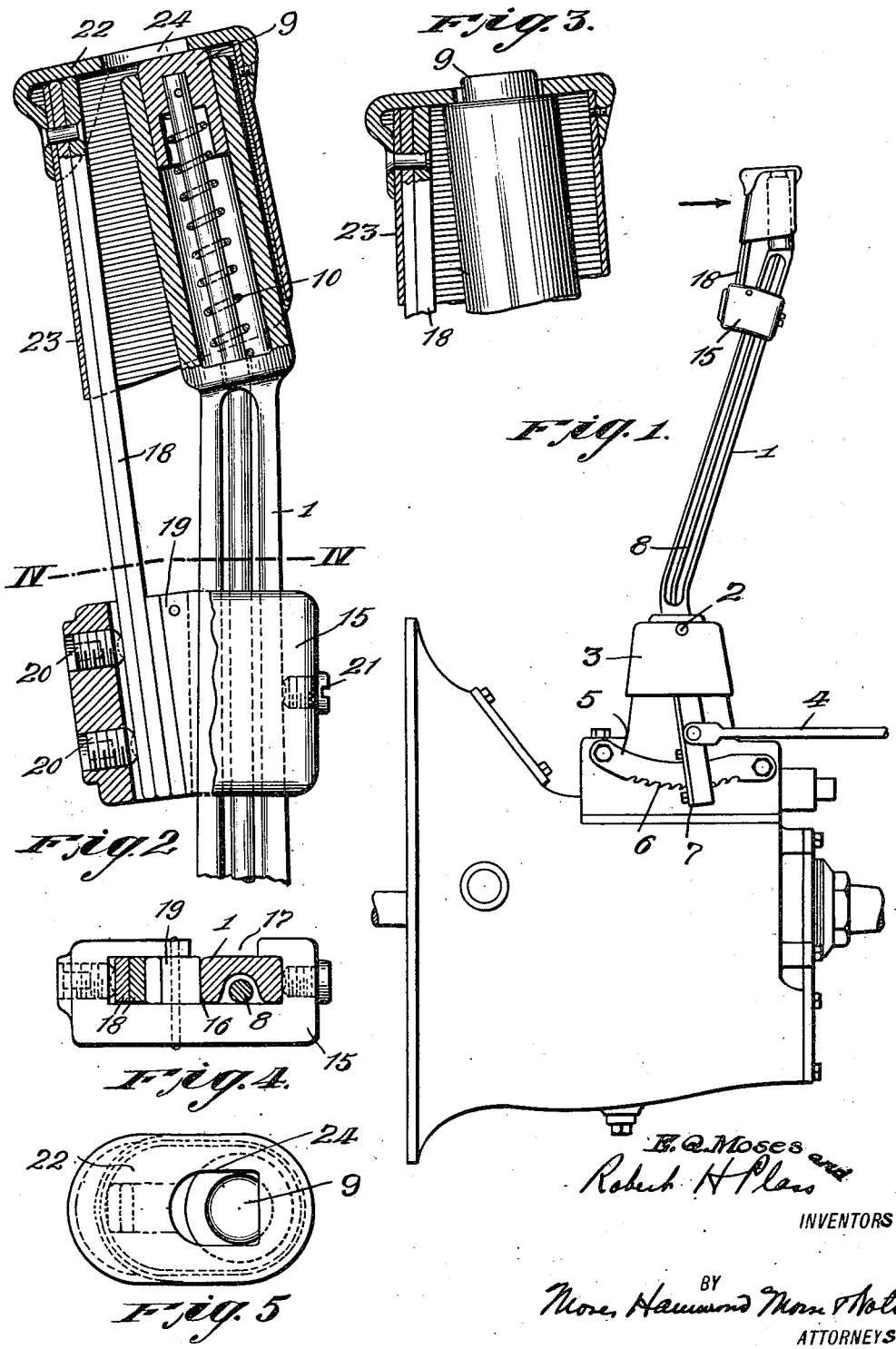

1,449,831

UNITED STATES PATENT OFFICE.

EDMUND QUINCY MOSES, OF NEW YORK, N. Y., AND ROBERT H. PLASS, OF UPPER MONTCLAIR, NEW JERSEY; SAID PLASS ASSIGNOR TO SAID MOSES.

SAFETY-BRAKE-OPERATING MECHANISM.

Application filed April 15, 1922. Serial No. 553,077.

*To all whom it may concern:*

Be it known that we, EDMUND QUINCY MOSES, a citizen of the United States, residing in New York, county and State of New York, and ROBERT H. PLASS, a citizen of the United States, residing in Upper Montclair, county of Essex and State of New Jersey, have invented certain new and useful Improvements in Safety-Brake-Operating Mechanism, of which the following is a specification.

This invention relates to operating mechanism for brakes of the general type set forth in the application of Edmund Quincy Moses, Serial No. 463,067, filed April 20th, 1921. The invention is especially applicable to the "emergency" brakes commonly used upon motor vehicles, and the object of the invention is to provide a simple means whereby the operation of the brake mechanism is improved in several particulars. An important object achieved by the present invention consists in producing a brake which will not be locked in applied position except after an adequate and predetermined force has been applied to the brake. The use of the invention also makes the brake more easily applied and released, as the snapping of the brake locking pawl over numerous teeth of the ratchet is avoided. The invention also avoids the danger of dragging brakes; as the brake is either applied so tightly that driving of the vehicle with the brake applied is impossible, or the brake is not held in applied position at all. In other words, the construction is such that the brake is either tightly applied or completely released. The improved construction also avoids the danger of the brake lever being retained in partly applied position when moved by the action of the parts when a vehicle encounters an obstruction in the road which causes excessive compression of the vehicle springs. This is an experience frequently encountered when driving vehicles having what is known as the "Hotchkiss drive" over rough roads. Another object of the invention is the provision of a mechanism for accomplishing the above results which can be readily applied to the brake levers without requiring any change in the construction thereof.

In the accompanying drawings, in which we have shown one preferred embodiment of the invention, Figure 1 is a side elevation showing an automobile transmission gear case having the emergency brake lever mounted thereon in the usual manner, the improved construction being applied to the upper end of the brake lever.

Figure 2 is a view showing the upper end of the brake lever partly in section and illustrating, mainly in vertical section, the attachment embodying the present invention.

Figure 3 is a view showing the upper end of the brake lever in elevation, and the upper end of the attachment in section, and illustrating the parts in the position occupied when the brake is applied.

Figure 4 is a horizontal sectional view on line IV—IV of Figure 2.

Figure 5 is a top plan view of the end of the brake lever and attachment.

Referring to the drawings in details, the invention is shown as embodied in an attachment which can be readily applied to the upper part of the brake lever 1. The brake lever is shown as pivoted at 2 to a support 3, and attached to the lower part of the brake lever is the brake pull rod 4 which leads to the brake band not shown. Attached to the support 3 is a rack bar 5 provided with teeth 6. The brake lever is provided with a pawl in the form of a slotted slidingly mounted bar 7 which is adapted to engage with the teeth 6, this slotted member or pawl being arranged so that it may be depressed to disengage the teeth by means of a push rod 8, the upper end of which is fitted with a thumb piece or push button 9. A coil spring 10, mounted in a recess in the handle of the brake lever, serves to urge the rod 8 and button 9 upwardly, thereby drawing the slotted bar or pawl 7 into engagement with a tooth on the rack bar 5 whenever the push button 9 is not forcibly depressed. The parts thus far described are common in the art, and it will be understood that the invention may be adapted to other conventional forms of brake construction than the particular example described.

The embodiment of the invention illustrated comprises a base 15 adapted to be clamped to the brake lever 1 in any suitable manner. As illustrated the base is provided with a recess 16 which is open at one side as indicated at 17 to permit ready application to the lever. Supported in the recess in the base is the lower end of a spring which may comprise one or more leaves 18. A wedge or filler member 19 is shown as interposed between the springs and the lever. Screws 20 and 21 engage the spring and back of the brake lever respectively so that when tightened up they cause both the brake lever and the springs to be firmly held in the base. Any suitable construction for supporting the springs upon the brake lever may be substituted for the particular form described. The springs 18, at their upper ends, carry a cap or top member 22 and a sleeve portion 23. The cap 22 is provided with an opening 24 sufficient in size to permit the push button 9 to project therethru as shown in Figure 3. When the push button 9 is depressed, however, by the thumb of the user then the spring 18 throws the cap member forward to the position shown by Figures 1 and 2, thus causing a portion of the cap member to over lie the top of the button and hold the same depressed. This is the normal position of the parts when the brake is not applied and it is seen therefore, that the pawl is normally held out of engagement with the teeth on the rack so that the brake is necessarily completely released, and dragging is impossible. It is also impossible for the brake to catch in partly applied position owing to the vehicle going over a bump which causes a violent depression of the springs and consequently movement of brake rod 4.

When the brake is to be applied, the operator grasps the sleeve 23 and pulls in the direction of the arrow shown in Figure 1. It will be seen that the force used to apply the brake is transmitted to the lever through the springs 18. These springs are made of such stiffness that they will yield sufficiently to permit the cap 22 to release the push button 9 only after the desired amount of force has been applied to the brake by the lever to insure the proper application of the brake. Until the predetermined force has been applied, pawl 7 remains out of engagement with the teeth on the rack so that there is no snapping of the pawl over successive teeth resulting in wear on the rack and discomfort to the operator. When, however, the desired force has been applied the springs yield and the push button snaps through the opening 24, thus causing the brake to become at once locked in applied position. By making the sleeve 23 substantially surround the brake handle it is not possible to bend the springs by merely squeezing with the hand, but there must be an actual pull upon the brake lever in the direction necessary to apply the brake. To release the brake, it is merely necessary to pull in the direction of the arrow so as to take the pressure off the pawl as is customary in operating brakes of this character, depress the button 9 with the thumb and then release the pull upon the brake lever, which causes the cap to at once slide over the end of the button and hold it depressed. The brake is thus instantly and necessarily completely released. As partial release of the brake is impossible the danger of running the car with dragging brakes is eliminated.

While we have shown and described in detail but one of the many possible specific embodiments of the invention, we do not wish to be understood as thereby limiting ourselves to such specific embodiment. On the contrary we intend to cover the invention broadly in whatever form its principle may be embodied.

Having thus described our invention, we claim:

1. An attachment for brake levers comprising a member adapted to be secured to the lever, a member adapted to normally hold the pawl actuating means of the lever in unlocked position and yielding means interposed between said members.

2. An attachment for brake levers comprising a member adapted to be mounted on the brake lever, a spring carried by said member, and a second member carried by said spring normally in such a position as to hold the pawl mechanism of the lever in unlocked position.

3. An attachment for brake levers comprising a member adapted to be mounted on the lever and a hand grip member yieldingly supported by said first member, said hand grip member being formed to normally hold the pawl mechanism of the brake lever in unlocked position.

4. A lever of the character described including a brake applying portion and means for locking the same in applied position, and a force receiving portion yieldingly connected to the brake applying portion and adapted to transmit force to the latter through the yielding connection, said force receiving portion being constructed to hold the locking mechanism of the brake in inoperative position until sufficient force has been applied to cause said force receiving portion to yield with respect to the brake applying portion of the lever.

5. The combination with a vehicle brake lever having pawl and ratchet mechanism for holding it in applied position, said pawl and ratchet mechanism including a push rod and a button projecting at the upper end of the lever, of a base attached to the lever, a spring carried by said base, and a cap member carried by said spring, said cap member having a hand grip portion and a portion adapted to engage said push button and hold the same depressed except when a brake applying force has been applied to said hand grip portion.

In testimony whereof we have affixed our signatures to this specification.

EDMUND QUINCY MOSES.
ROBERT H. PLASS.